Dec. 28, 1926.

R. T. MERRILL

VENTILATOR

Filed May 1, 1922

1,611,934

WITNESSES
M. E. Downey
C. L. Waal

INVENTOR
Robert T. Merrill
By R. S. Colwell
ATTORNEY

Patented Dec. 28, 1926.

1,611,934

UNITED STATES PATENT OFFICE.

ROBERT T. MERRILL, OF MILWAUKEE, WISCONSIN.

VENTILATOR.

Application filed May 1, 1922. Serial No. 557,751.

The invention relates to ventilators.

The principal object of the invention is to provide a device of this character which may be placed on ventilator conduits and efficiently handle the large volumes of gases carried through the conduits.

A further object of the invention is to provide a ventilator which may be made of any desired length.

With the above and other objects in view the invention consists in the ventilator as herein claimed and all equivalents.

Figure 1:
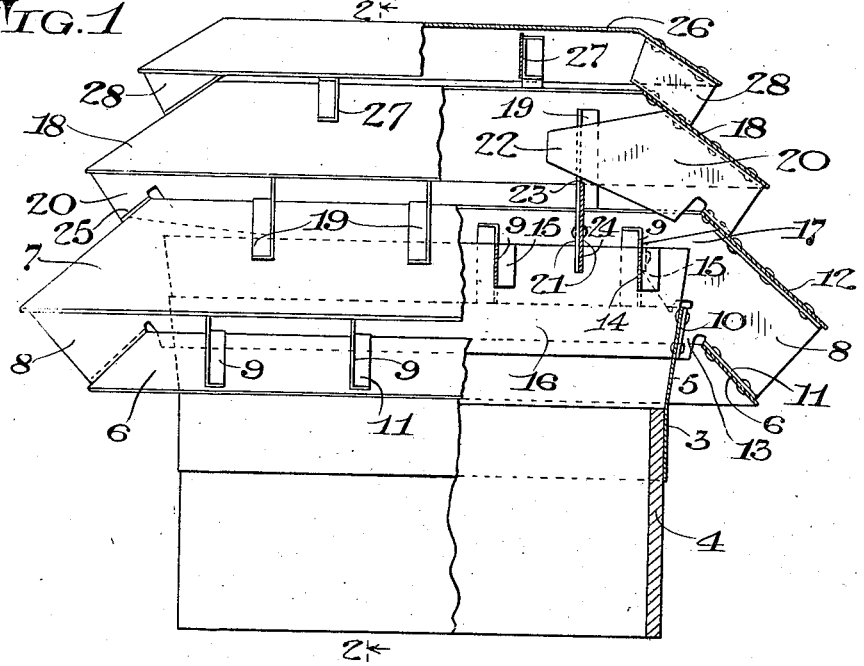
Figure 2:
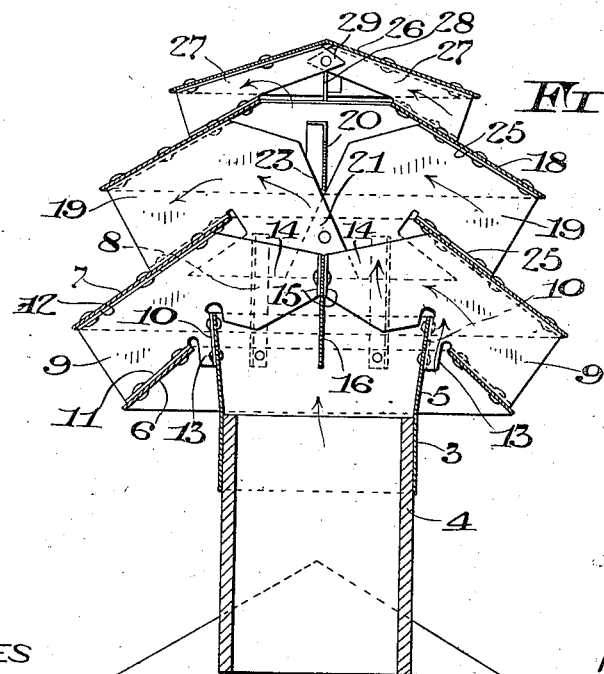

In the accompanying drawings: Fig. 1 is a side view of a device embodying the invention, parts being broken away and parts being shown in section; Fig. 2 is a section taken on the line 2—2 of Fig. 1.

In the drawings the numeral 3 indicates a draft tube or pipe which may be connected up to a ventilator tube 4 in the ordinary way, the upper end 5 of said draft tube being preferably flared outwardly.

A downwardly flaring prismoidal deflector 6 and a downwardly flaring prismoidal deflector 7, in which the sides are generally longer than the ends, are connected together in spaced relation by vertically disposed parallel partitions 8 at the ends and vertically disposed parallel partitions 9 at the sides. The partitions 8 and 9 each have angled portions 10 riveted to the tube, angled portions 11 riveted to the deflector 6 and angled portions 12 riveted to the deflector 7. The deflector 6 is spaced a short distance from the draft tube to form channels 13 so that air currents striking the sides of the draft tube below the lower deflector 6 will be directed upwardly and add their force to the air currents entering between the deflectors 6 and 7. The pitch of deflector 6 is greater than that of deflector 7 to form converging channels so that the velocity of the air increases as it passes through the space between said deflectors toward the axis of the tube.

The partitions 9 have extensions 14 provided with flanged portions 15 riveted to a vertically disposed deflector plate 16 which extends lengthwise of the tube 4 and is suspended centrally thereof by its attachment to said extensions 14. The extensions 14 of the partitions 9 and the plate 16 at the upper end of the tube 3 prevent the possibility of cross-drafts by breaking them up and directing them upwardly. The partitions 8 have extensions 17 secured to the extensions 14 of those partitions 9 which are located adjacent the ends of the tube, in the way that the extensions 14 are secured to the plate 16.

A downwardly flaring prismoidal deflector 18 and the deflector 7 are connected together in spaced relation by vertically disposed parallel side partitions 19 and vertically disposed end partitions 20, the side partitions 19 having overlapping extensions 21 riveted together and each end partition 20 having an extension 22 extending through a notch 23 formed between the adjacent side partitions 19. The extensions 21 of the side partitions 19 preferably extend below the partitions 8 and the upper edges of the partitions 8 and the plate 16 which has notches 24 cut therein for this purpose. These extensions 21 prevent the possibility of cross-drafts or currents by breaking them up and directing them upwardly. The pitch of the deflector 7 is greater than that of the deflector 18 to form converging channels so that the velocity of the air increases as it passes through the space between said deflectors toward the axis of the tube. The partitions 19 and 20 have flanged portions 25 riveted to the deflectors 7 and 18.

A downwardly flaring ridged cap 26, shaped like a hip roof, is mounted above and spaced from the deflector 18 by parallel side partitions 27 and end partitions 28 which have flanged portions riveted to said cap and the deflector 18. The partitions 27 have extensions 29 joined together at their ends, as by riveting, and serving to break up cross-currents. The side partitions 9, 19, and 27, in each set, are laterally offset with respect to those in adjacent sets, thereby forming effective baffles for the re-direction of cross currents upwardly and laterally, according to their position, without interfering with the eduction flow of vitiated air at the leeward end of the ventilator. In the case of partitions 9 and 19 this offset relation permits the inner extensions of the partitions 19 to project downwardly below the upper edges of the partitions 9, thereby securing an improved baffling effect at this level. The pitch of the deflector 18 is greater than the slopes of the cap 26 to form converging channels so that the velocity of the air increases as it passes through the space between said deflector and cap toward the axis of the tube. The upper openings of the deflectors progressively decrease in area toward the cap 26 to form a converging passage. The general courses of the air currents through the device are indicated by arrows in Fig. 2. This form of ventilator provides a simple and efficient construction for handling large volumes of air.

What I claim as my invention is:

1. In a ventilator, the combination, with a draft tube of oblong rectangular section, of a series of spaced downwardly flaring prismoidal deflectors at the outer end of the tube, a downwardly flaring cap above the upper deflector, spaced partitions mounting said deflectors and cap in vertically spaced relation, some of said partitions forming vertical deflectors extending across the space above the tube to define a plurality of parallel transverse air passages, the several partitions forming the transverse passages being laterally off-set with respect to those forming the vertically adjacent transverse passages, and a vertically-disposed deflector extending longitudinally above the draft tube and supported from some of said partitions.

2. In a ventilator, the combination, with a draft tube having an elongated discharge opening, of a plurality of elongated downwardly flaring deflectors disposed at the outer end of said draft tube, a downwardly flaring cap above the upper deflector, spaced partitions mounting said deflectors and cap in vertically spaced relation and some of the said partitions forming substantially parallel deflectors extending transversely across the space above the draft tube to define a plurality of transverse air passages, said transverse deflector-spacing partitions in one set being laterally offset from those in the vertically adjacent set and the lower edges of one set of partitions projecting below the upper edges of the subjacent set of partitions with passages between them, and a deflector extending longitudinally of the discharge opening of the draft tube.

3. In a ventilator, the combination, with a draft tube, of a series of downwardly flaring prismoidal deflectors at the upper end of the tube, vertical partitions spacing adjacent deflectors and connecting them together to form air passages therewith, the several partitions forming the transverse passages being offset with respect to those forming the vertically adjacent transverse passages, some of said partitions forming vertical deflectors extending across the space above the tube, a longitudinally extending vertically disposed deflector suspended from some of said partitions, a downwardly flaring cap extending longitudinally above the upper deflector, and vertical partitions mounting said cap in spaced relation to said upper deflector, the transverse partitions between said cap and upper deflector being laterally offset from the partitions forming the subjacent air passages.

4. In a ventilator, the combination, with a draft tube, of a series of downwardly flaring prismoidal deflectors at the upper end of the tube, vertical partitions spacing adjacent deflectors and connecting them together to form air passages therewith, the several partitions forming the transverse passages being offset with respect to those forming the vertically adjacent transverse passages, some of said partitions forming vertical deflectors extending across the space above the tube and downwardly below the upper edge of the subjacent deflector, a longitudinally extending vertically disposed deflector suspended from some of said partitions, a downwardly flaring cap extending longitudinally above the upper deflector, and vertical partitions mounting said cap in spaced relation to said upper deflector, the transverse partitions between said cap and upper deflector being joined at their inner ends and laterally offset from the partitions forming the subjacent air passages.

In testimony whereof, I affix my signature.

ROBERT T. MERRILL.